United States Patent
Eleftheriou et al.

(10) Patent No.: US 7,684,139 B2
(45) Date of Patent: Mar. 23, 2010

(54) READ CHANNEL APPARATUS FOR ASYNCHRONOUS SAMPLING AND SYNCHRONOUS EQUALIZATION

(75) Inventors: Evangelos S. Eleftheriou, Zurich (CH); Robert A. Hutchins, Tucson, AZ (US); Glen A. Jaquette, Tucson, AZ (US); Jens Jelitto, Rueschlikon (CH); Sedat Oeloer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 12/166,136

(22) Filed: Jul. 1, 2008

(65) Prior Publication Data

US 2008/0259484 A1 Oct. 23, 2008

Related U.S. Application Data (63) Continuation of application No. 11/213,127, filed on Aug. 26, 2005, now Pat. No. 7,394,608.

(51) Int. Cl.
*G11B 5/035* (2006.01)
(52) U.S. Cl. ............. 360/65; 360/51; G9B/5.026; G9B/5.032
(58) Field of Classification Search ............... None
See application file for complete search history.

(56) References Cited

U.S. PATENT DOCUMENTS

| | | | |
|---|---|---|---|
| 4,847,877 A | 7/1989 | Besseyre | |
| 5,132,988 A | 7/1992 | Fisher et al. | |
| 5,430,661 A | 7/1995 | Fisher et al. | |
| 5,835,296 A | 11/1998 | Van Den Enden | |
| 5,966,415 A | 10/1999 | Bliss et al. | |
| 6,009,549 A | 12/1999 | Bliss et al. | |
| 6,055,119 A | 4/2000 | Lee | |
| 6,084,924 A | 7/2000 | Melas | |
| 6,111,710 A | 8/2000 | Feyh et al. | |

(Continued)

FOREIGN PATENT DOCUMENTS

EP 0324571 7/1998

(Continued)

OTHER PUBLICATIONS

European Patent Office, Communication pursuant to Article 94(3) EPC, Nov. 8, 2008.

*Primary Examiner*—Daniell L Negrón
(74) *Attorney, Agent, or Firm*—Dale F. Regelman; Quarles & Brady LLP (57) ABSTRACT

A read channel and method using that read channel are disclosed. The read channel comprises an analog to digital converter which asynchronously samples at a fixed rate an analog signal formed by reading a data track, where that data track was written to a data storage medium at a symbol rate and an interpolator interconnected with the analog to digital converter. The read channel further comprises a fractionally-spaced equalizer, where the interpolator provides an interpolated signal to the fractionally-spaced equalizer at an interpolation rate, where that interpolation rate is greater than the symbol rate. The fractionally-spaced equalizer forms a synchronous equalized signal. The read channel further comprises a gain control module interconnected with the fractionally-spaced equalizer, and a sequence detector interconnected with the gain control module.

6 Claims, 9 Drawing Sheets

U.S. PATENT DOCUMENTS

| | | |
|---|---|---|
| 6,233,107 B1 | 5/2001 | Minuhin |
| 6,307,900 B1 | 10/2001 | Choi |
| 6,625,235 B1 | 9/2003 | Coker et al. |
| 6,801,380 B1 | 10/2004 | Sutardja |
| 6,816,328 B2 | 11/2004 | Rae |
| 6,904,084 B2 | 6/2005 | Huang et al. |
| 2003/0043898 A1 | 3/2003 | Huang et al. |
| 2003/0081670 A1 | 5/2003 | Bologna et al. |
| 2004/0250197 A1 | 12/2004 | Takehara |
| 2006/0119964 A1 | 6/2006 | Eleftheriou et al. |
| 2006/0256464 A1 | 11/2006 | Ozdemir |

FOREIGN PATENT DOCUMENTS

| | | |
|---|---|---|
| JP | 04183016 | 6/1992 |

READ CHANNEL APPARATUS FOR ASYNCHRONOUS SAMPLING AND SYNCHRONOUS EQUALIZATION

CROSS-REFERENCE TO RELATED APPLICATIONS

This application is a Continuation application claiming priority from the Application having Ser. No. 11/213,127, now U.S. Pat. No. 7,394,608.

FIELD OF THE INVENTION

Applicants' invention relates to an apparatus and method to read information encoded to a data storage medium using asynchronous sampling and synchronous equalization.

BACKGROUND OF THE INVENTION

Automated media storage libraries are known for providing cost effective access to large quantities of stored media. Generally, media storage libraries include a large number data storage media. In certain implementations, such an information storage and retrieval system comprises a plurality of storage slots on which are stored portable data storage media. The typical data storage media comprises one or more magnetic tapes, one or more optical disks, one or more magnetic hard disks, electronic storage media, and the like.

As the amount of information written to a data storage medium increases, it becomes more difficult to read that information, and to distinguish valid data signals from noise. What is needed is an apparatus and method to reliably read information encoded to a data storage medium.

SUMMARY OF THE INVENTION

Applicants' invention comprises a read channel and method using that read channel. Applicants' read channel comprises an analog to digital converter which asynchronously samples an analog signal formed by reading a data track, where that data track was written to a data storage medium at a symbol rate, or a rate specified by the write equalization process, and an interpolator interconnected with the analog to digital converter.

Applicants' read channel further comprises a fractionally-spaced equalizer, where the interpolator provides an interpolated signal to the fractionally-spaced equalizer at an interpolation rate, where that interpolation rate is greater than the symbol rate. The fractionally-spaced equalizer forms a synchronous symbol-spaced equalized signal. Applicants' read channel further comprises a gain control module interconnected with the fractionally-spaced equalizer, and a sequence detector interconnected with the gain control module.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a read channel assembly used to read information from a magnetic tape. The following description of Applicants' method to adjust the amplitudes of a plurality of digital signals is not meant, however, to limit Applicants' invention to either reading information from a magnetic tape, or to data processing applications, as the invention herein can be applied to reading information from an information storage medium in general.

Applicants' invention comprises an apparatus, i.e. a read channel, and a method using that apparatus, to read information from an information storage medium by asynchronously sampling an analog signal comprising information encoded to the storage medium, and then synchronously equalizing those samples. Applicants' method is summarized in FIGS. 7 and 8.

Figure 1A:
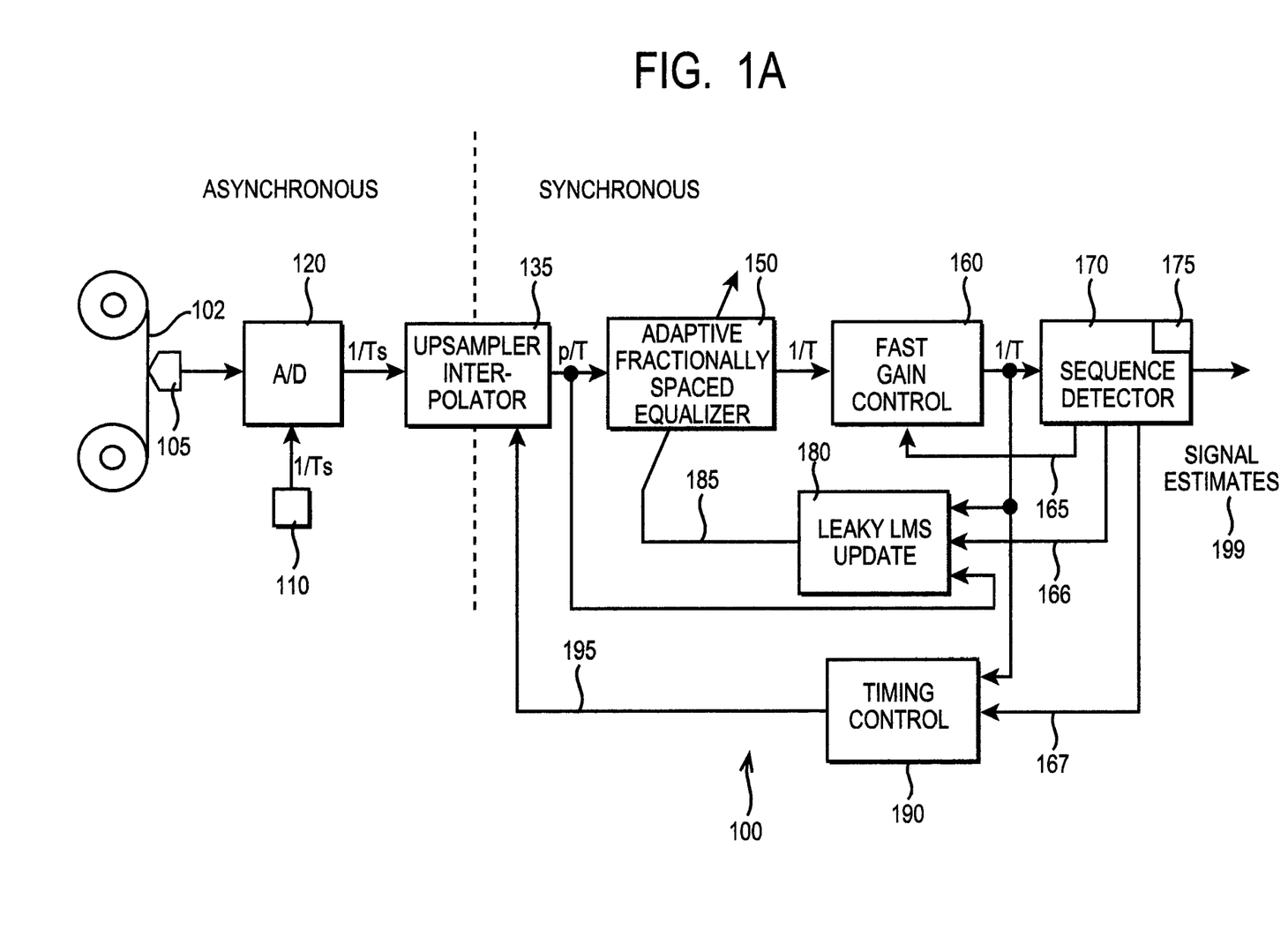
FIG. 1A is a block diagram showing a first embodiment of Applicants' read channel.
Figure 7:
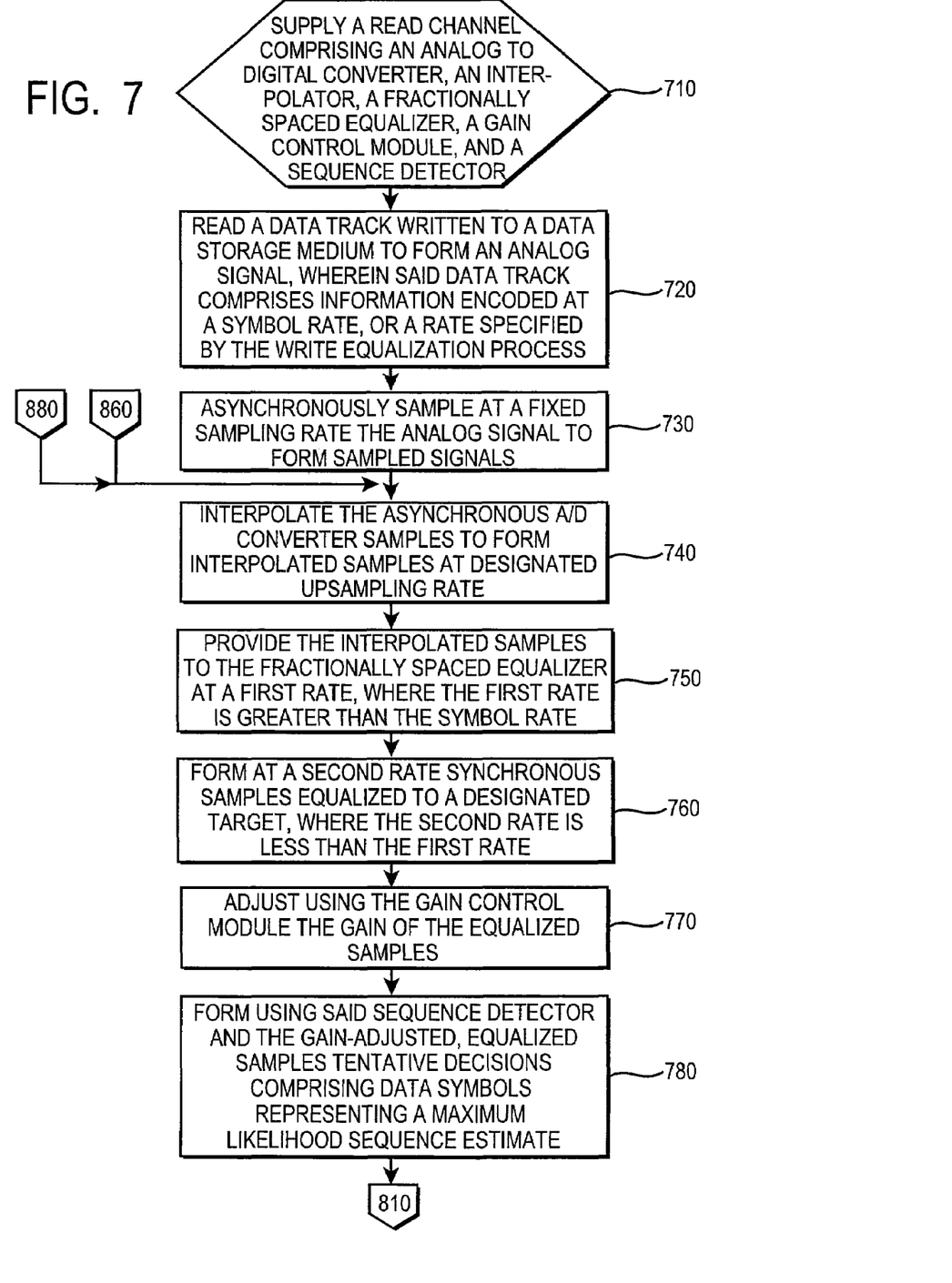
FIG. 7 is a flow chart summarizing certain steps in Applicants' method.

Referring now to FIGS. 1A and 7, in step 710 Applicants' method supplies a read channel comprising an analog to digital converter, an interpolator interconnected with the analog to digital converter, a fractionally-spaced equalizer interconnected with the interpolator, a gain control module interconnected with the fractionally-spaced equalizer, and a sequence detector interconnected with the gain control module.

In step 720, read head 105 generates an analog signal from reading data encoded on magnetic tape 102 as tape 102 moves past read head 105. In certain embodiments, the data written to tape 102 was encoded at a first rate, i.e. the symbol rate. In certain embodiments, the first rate was specified by the write equalization process. Read head 105 provides that analog signal to analog to digital converter 120. Fixed frequency clock 110 provides timing signals to A/D converter 120.

In step 730, the analog signal is sampled asynchronously with respect to the clock used to write the data symbols. Applicants have found that asynchronous sampling channels allow reduced implementation complexity because a digital phase-blocked loop replaces the analog phase locked oscillator used in synchronous sampling. As a result, many problems caused by the variations in analog components are eliminated. Where (N) data tracks are being read using synchronous sampling, (N) analog PLOs are needed, i.e. one analog PLO per channel.

In contrast, where (N) data tracks are being read using Applicants' apparatus and method, one system-wide, free running clock 110 controls the sampling of the (N) analog signals to obtain the asynchronous samples for the (N) channels. In this case, the need for (N) analog PLOs is avoided and (N) digital phase-lock loops are used. Increasing the sampling rate with respect to the data rate reduces errors due to aliasing.

In step 740, the asynchronously sampled signals are provided to upsampler/interpolator 135 which computes synchronous samples by interpolation at a designated upsampling rate. In step 750, Applicants' upsampler/interpolator 135 provides synchronous samples to fractionally-spaced equalizer 150. Thus, Applicants' apparatus and method employ asynchronous signal sampling in combination with synchronous fractionally-spaced equalization.

Figure 2:
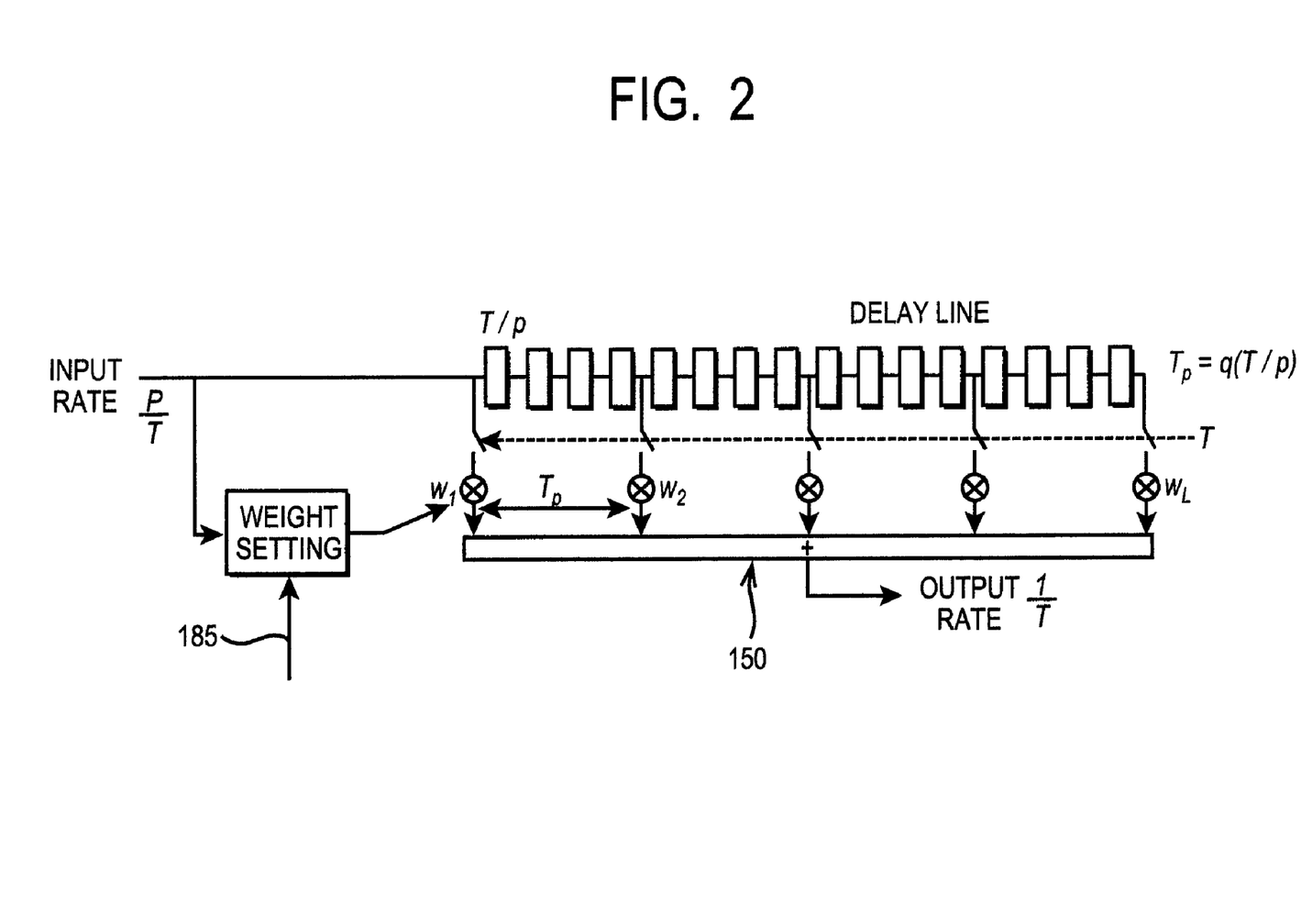
FIG. 2 is a block diagram showing Applicants' fractionally-spaced equalizer.

Referring now to FIGS. 1A, 2, and 7, in step 750 fractionally-spaced equalizer 150 receives at a rate p/T samples from sampler/interpolator 135. The value of p is an integer greater than or equal to 2. The equalizer weights w1, w2, w3 ... wL tap the equalizer delay line every q*T/p delay elements starting before the first delay element.

In step 760, fractionally-spaced equalizer 150 accepts p input samples per data symbol interval T and produces one sample every T. The equalizer weights w1, w2, w3 ... wL are also updated every symbol interval T. Thus, the output sample rate is 1/T, while the input sample rate is p/T. The weight-updating occurs at the output rate 1/T. The output from equalizer 150 comprises the ideal distortion-free channel-output signal, and distortion due to residual intersymbol interference from misequalization, and colored noise.

Fractionally-spaced equalizer 150 provides synchronous, equalized samples to gain control module 160 at a rate of 1/T. In step 770, the gain control module 160 adjusts the gain of the equalized samples.

In step 780, the gain-adjusted, synchronous, equalized samples are processed by sequence detector 170, wherein detector 170 is configured to produce signal estimates based on detector decisions, e.g., signal estimates from data decisions along a survivor sequence of the maximum likelihood sequence detector. As those skilled in the art will appreciate, the sequence detector provides those detected data symbols to a decoder which decodes those data symbols.

Figure 8:
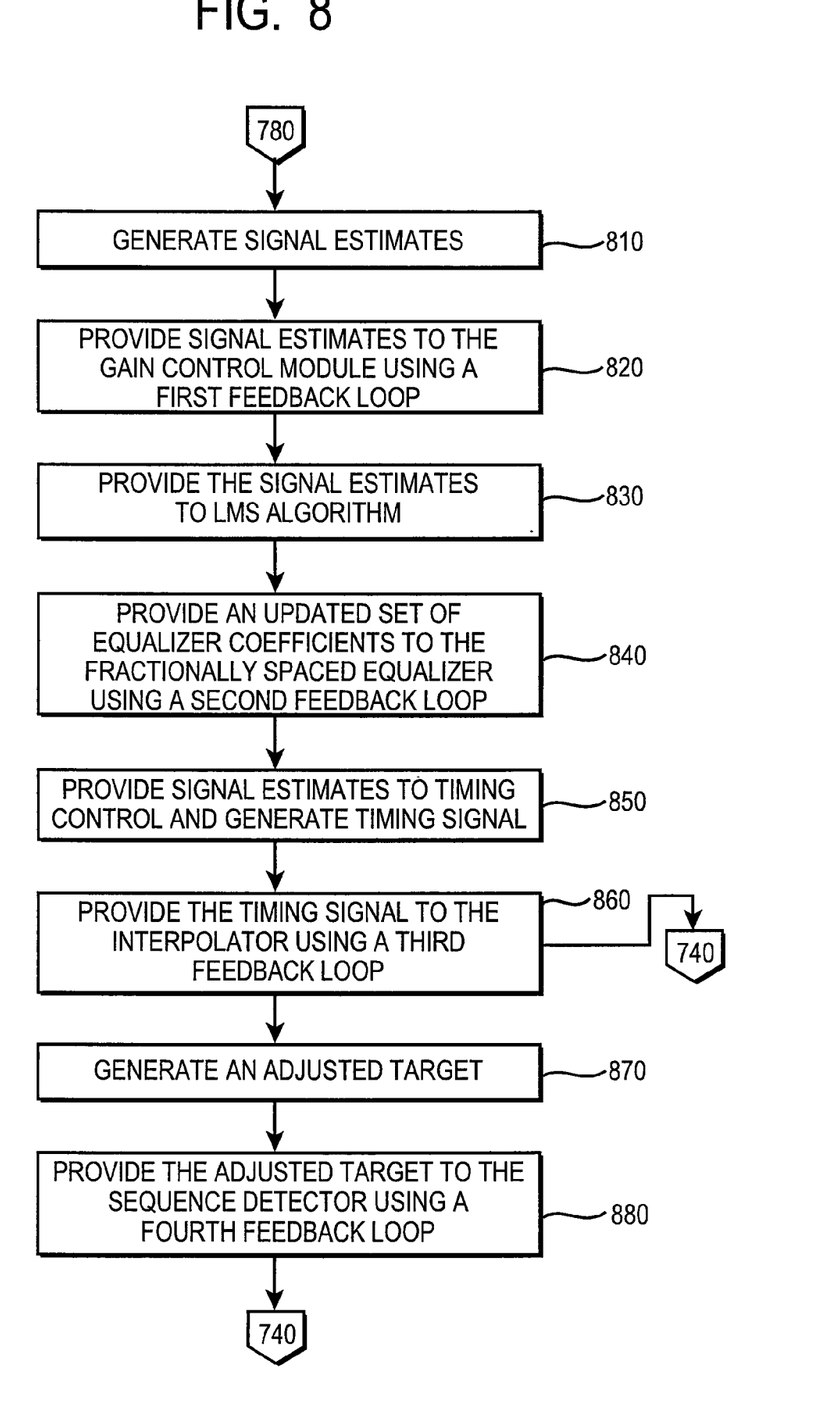
FIG. 8 is a flow chart summarizing additional steps in Applicants' method.

Referring now to FIGS. 1A and 8, Applicants' read channel 100 comprises a first feedback loop comprising communication link 165. In step 810 Applicants' method generates signal estimates 199 by sequence detector 170. In step 820, those signal estimates 199 are provided to gain control module 160.

Applicants' read channel 100 further comprises a second feedback loop comprising communication link 166, least mean square ("LMS") algorithm 180, and communication link 185. Traditional LMS algorithms can show significant stability and performance deficiencies caused by (1) nonstationary, impulsive environmental noise, (2) finite precision arithmetic, and (3) measurement noise associated with quantization and electronic amplifiers. In certain embodiments, Applicants' LMS algorithm 180 comprises a "leaky" LMS algorithm wherein the leakage parameter addresses stability deficiencies that arise from nonstationary inputs, low signal-to-noise ratios, and finite-precision arithmetic.

In step 830, the signal estimates 199 are provided to LMS algorithm 180. In step 840, LMS algorithm 180 provides an updated set of equalizer coefficients to fractionally-spaced equalizer 150.

Applicants' read channel 100 further comprises a third feedback loop comprising communication link 167, timing control module 190, and communication link 195. In step 850, the signal estimates 199 are provided to timing control module 190, and timing control module 190 generates a timing signal. In step 860, that timing signal is provided to upsampler/interpolator 135.

In certain embodiments, Applicants' method transitions from step 860 to step 740 and continues as described herein. Although FIG. 8 shows steps 810 through 860 being performed seriatim, in certain embodiments of Applicants' apparatus and method steps 810 through 860 are performed substantially synchronously.

Figure 1B:
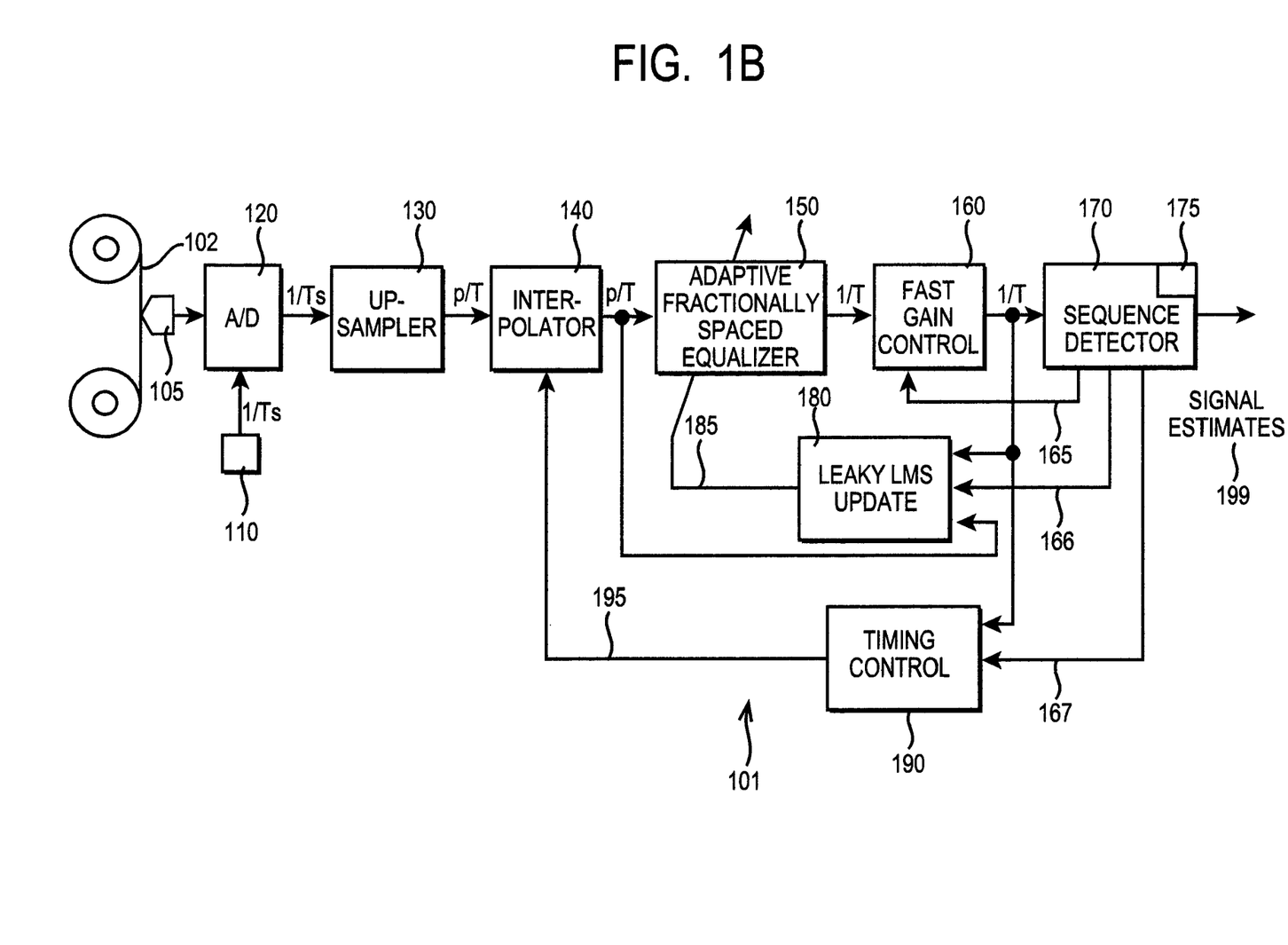
FIG. 1B is a block diagram showing a second embodiment of Applicants' read channel

Referring now to FIG. 1B, FIG. 1B is a block diagram showing Applicants' read channel 101. Read channel 101 comprises a separate upsampler 130 and interpolator 140.

In certain embodiments of Applicants' read channel 100/101, the equalizer adaptation feedback loop is decoupled from the gain adaptation feedback loop. Without decoupling, the interaction of these two feedback loops could potentially result in gain and/or equalizer coefficient drift that could decrease the overall performance of the read channel, and/or could lead to divergence of the adaptive loops in case the equalizer and gain control adaptations are not properly constrained.

Figure 3:
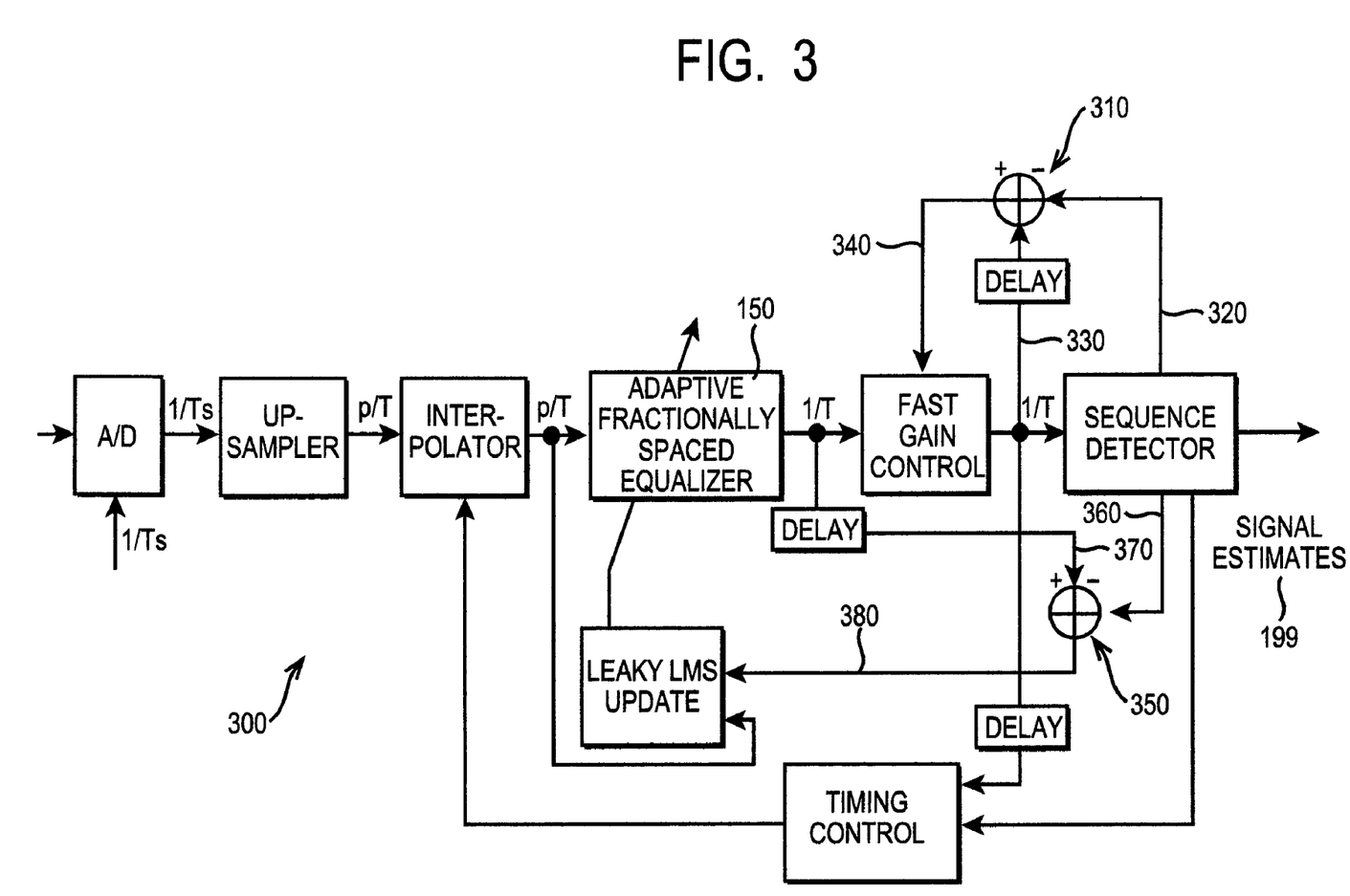
FIG. 3 is a block diagram showing a third embodiment of Applicants' read channel.

Referring now to FIG. 3, read channel 300 comprises gain adaptation loop 310 wherein a gain control error signal comprising the difference between a delayed output signal from gain control module 160 provided by communication link 330 and the signal estimates 199 formed by sequence detector 170 decisions provided by communication link 320 is provided to gain control module 160 using communication link 340.

Read channel 300 further comprises equalizer adaptation loop 350 wherein an equalizer error signal comprising the difference between a delayed equalized signal, provided by communication link 370, and the signal estimates 199 formed by sequence detector 170 decisions, provided by communication link 360, is provided by communication link 380 to LMS algorithm 180.

In certain embodiments, Applicants' apparatus and method employ equalization to a partial response class-4 (PR4) target and maximum-likelihood sequence detection using a Euclidean distance metric, a combination known in the art as PRML. In these PRML detector embodiments, sequence detector 170 comprises a PRML detector, and target polynomial 175 (FIG. 1A) comprises integer coefficients, i.e., $1-D^2$, where D denotes a delay operator.

At higher linear recording densities, a linear PR4 equalizer leads to substantial noise enhancement. In certain embodiments Applicants' apparatus and method, detector 170 comprises an Extended EPRML detector ("EPRML"). Such an EPRML detector 170, with a target polynomial of $(1-D^2)(1+D)$, is also a fixed structure wherein the target polynomial 175 cannot be adapted to changing channel operating points.

At even higher linear recording densities, an EPR4 target might lead to further noise enhancement. In certain embodiments Applicants' apparatus and method, detector 170 comprises an Extended EPRML detector ("E$^2$PRML"). Such an E$^2$PRML detector 170, with a target polynomial of $(1-D^2)(1+D)^2$, is also a fixed structure when the target polynomial 175 cannot be adapted to changing channel operating points.

In certain embodiments, Applicants have found that equalizing to a short target does not allow mitigating the mismatch of the channel and target, and the subsequent equalization required to alter the overall response leads to noise coloration, noise enhancement, and a resulting performance degradation. Alternatively, overly increasing the length of the target leads to an undesirable increase in the complexity of the maximum likelihood sequence detector.

In certain embodiments, Applicants' apparatus and method employ a Noise Predictive Maximum Likelihood ("NPML") detector. Applicants' NPML detector provides enhanced reliability by adding a noise whitening filter at the input to the sequence detector and performing sequence detection based upon a longer effective target. In certain of Applicants' NPML embodiments, Applicants' target polynomial comprises non-integer coefficients. By allowing the PR target polynomial to take noninteger coefficients, a better match to the channel is possible.

In certain embodiments, target polynomial 175 (FIGS. 1A, 1B) is set during initialization of the information storage and retrieval system comprising read channel 100. In other embodiments, target polynomial 175 is provided by a host computer interconnected with the information storage and retrieval system comprising read channel 100.

Figure 4:
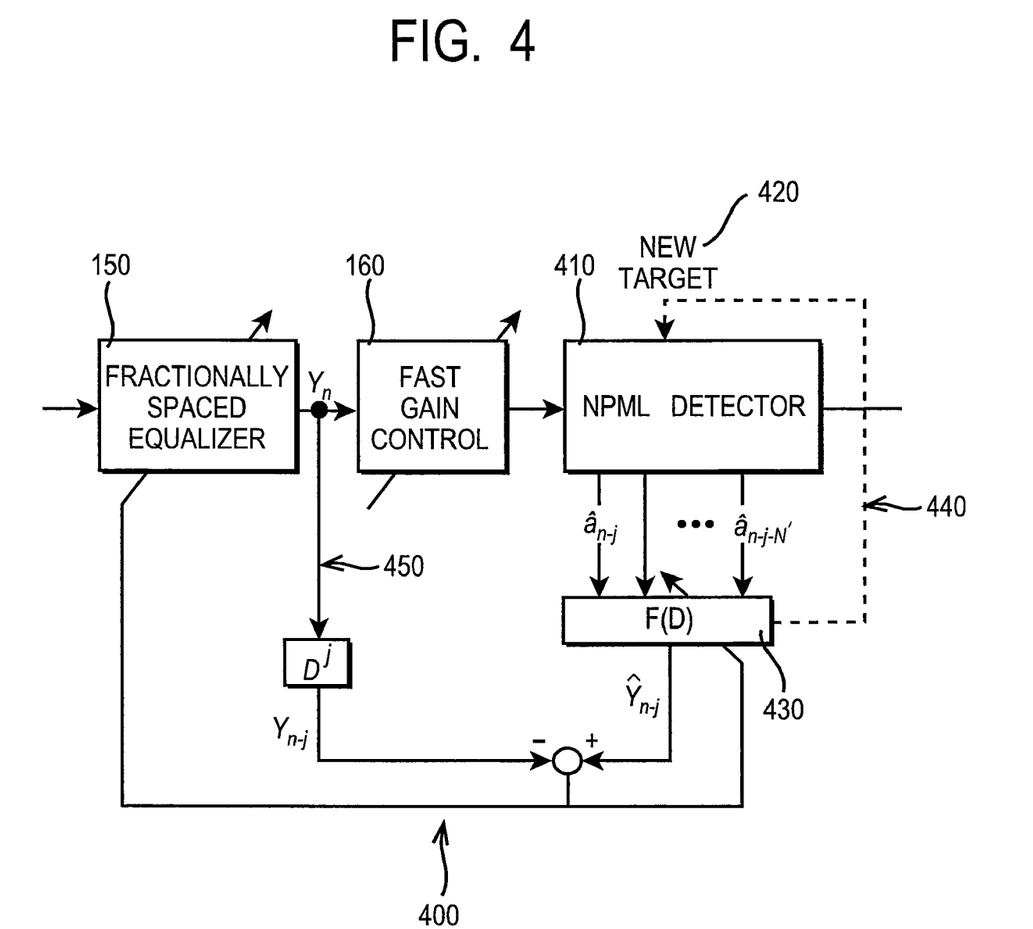
FIG. 4 is a block diagram showing a fourth embodiment of Applicants' read channel.

In certain embodiments of Applicants' apparatus and method, both a partial-response target and the fractionally-spaced equalizer are updated jointly. Referring now to FIG. 4, Applicants' read channel 400 comprises NPML detector 410, target adaptation loop 440 wherein circuit 430 provides an updated target 420 to NPML detector 410. At the same time, the equalizer output signal 450 is utilized to generate an equalizer error signal which is provided to fractionally-spaced equalizer 150. In this embodiment, the equalizer combines the functions of signal shaping and noise prediction.

Read channel 400 further comprises fixed clock 110, analog to digital converter 120, upsampler/interpolator 135 (FIG. 1A) or upsampler 130 (FIG. 1B) and interpolator 140 (FIG. 1B). In certain embodiments, read channel 400 further comprises gain adaptation loop 310 (FIG. 3), wherein the equalizer/target adaptations as well as the timing and gain adjustments are decoupled, as described above.

Referring now to FIGS. 4 and 8, in Applicants' target adaptation embodiments Applicants' method includes step 870 wherein Applicants' apparatus and method generate an adjusted target. In step 880, Applicants' apparatus and method provide that adjusted target to the NPML detector 410.

Figure 5:
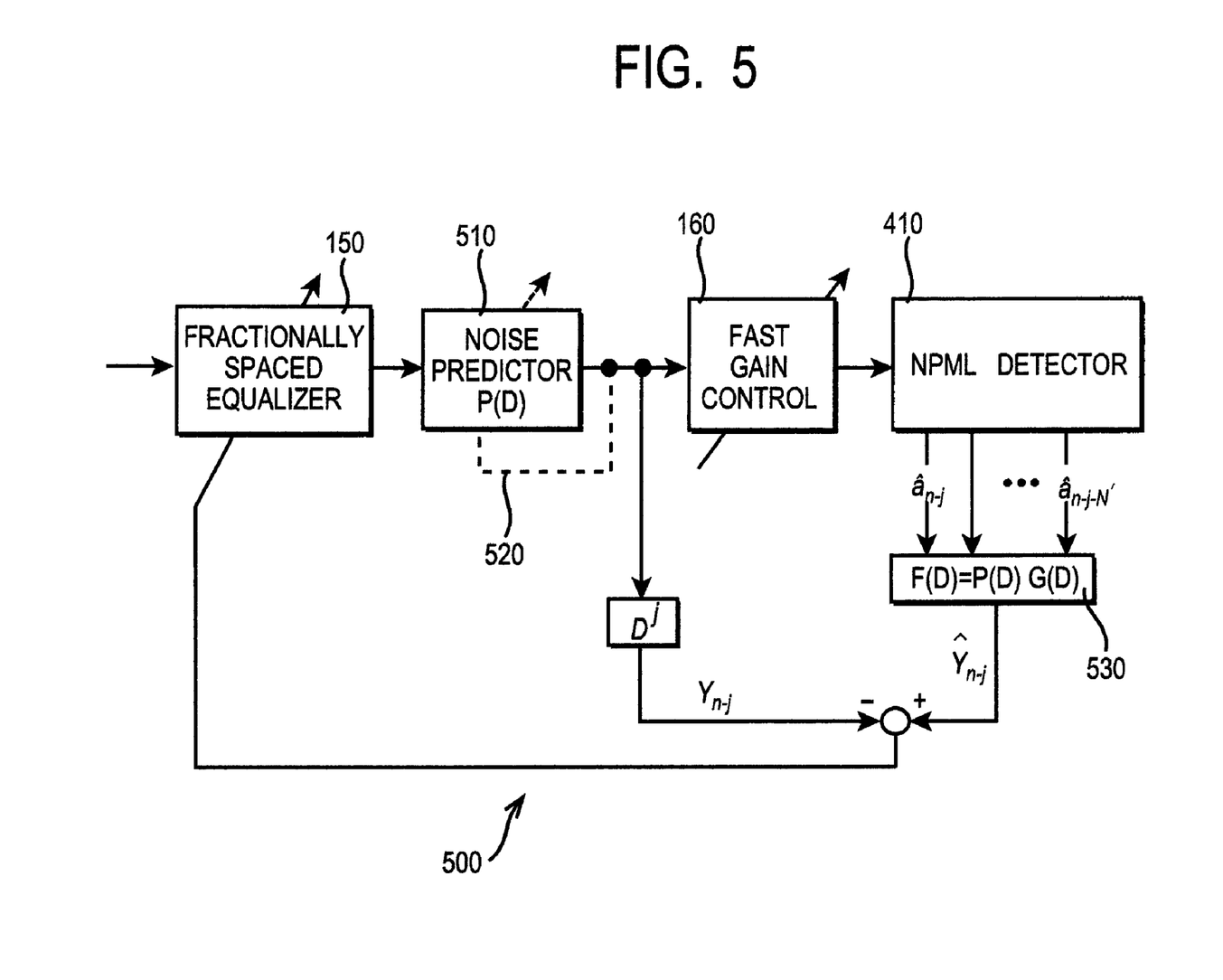
FIG. 5 is a block diagram showing a fifth embodiment of Applicants' read channel.

In certain embodiments, Applicants' read channel comprises separate implementations of the fractionally-spaced equalizer and noise prediction filters. For example referring to FIG. 5, read channel 500 comprises fractionally-spaced equalizer 150 in combination with noise prediction filter 510 comprising a noise prediction filter update loop 520, wherein both filters are adaptively adjusted. Read channel 500 further comprises fixed clock 110, analog to digital converter 120, upsampler/interpolator 135 (FIG. 1A) or upsampler 130 (FIG. 1B) and interpolator 140 (FIG. 1B). In certain embodiments, read channel 500 further comprises gain adaptation loop 310 (FIG. 3), wherein the equalizer adaptation as well as the timing and gain adjustments are decoupled, as described above.

Figure 6:
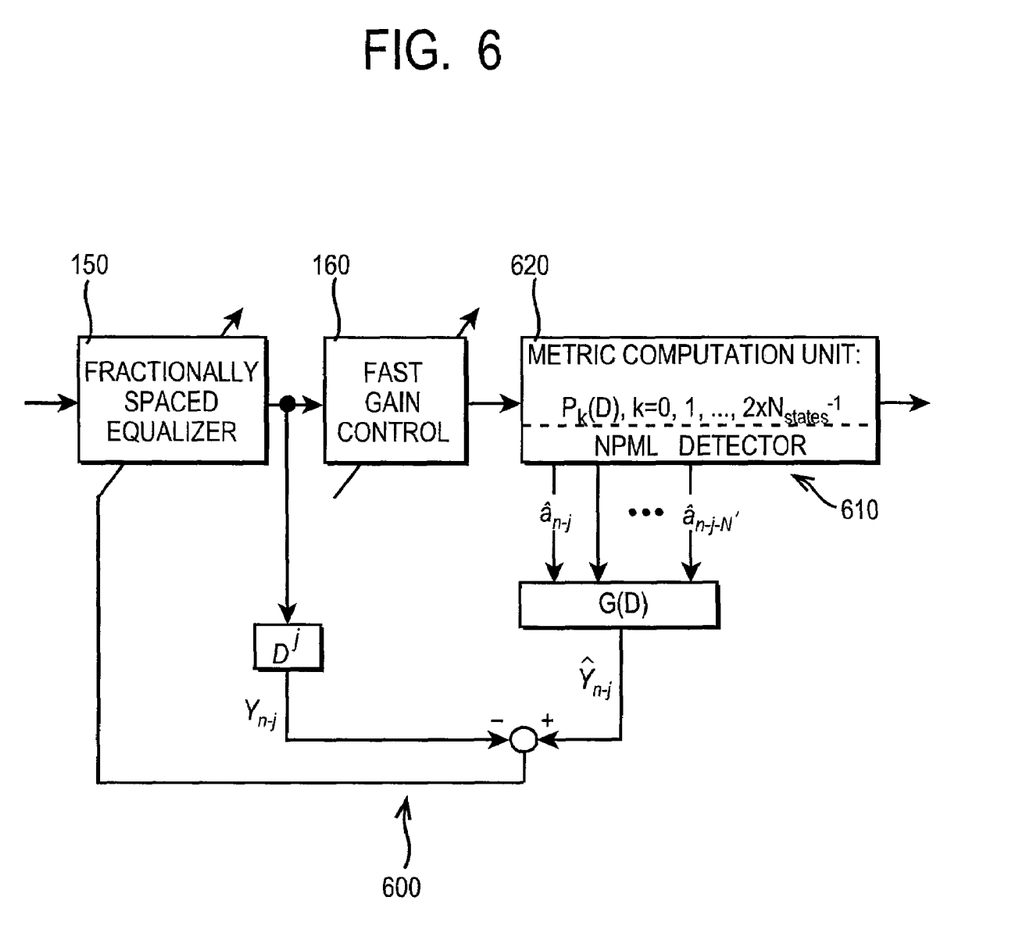
FIG. 6 is a block diagram showing a sixth embodiment of Applicants' read channel.

In certain embodiments, Applicants' apparatus comprises a state-dependent NPML detector. Referring now to FIG. 6, read channel 600 comprises NPML detector 610 which comprises metric computation unit 620, wherein the $P_k(D)$, k=0, 1 ... $2 \times N_{states} - 1$ denote the set of predictor coefficients corresponding to the (k)th transition on the NPML trellis. Read channel 600 further comprises fixed clock 110, analog to digital converter 120, upsampler/interpolator 135 (FIG. 1A) or upsampler 130 (FIG. 1B) and interpolator 140 (FIG. 1B). In certain embodiments, read channel 600 further comprises gain adaptation loop 310 (FIG. 3), wherein the equalizer adaptation as well as the timing and gain adjustments are decoupled, as described above.

Storage services providers may provide enhanced information storage services to storage services customers using Applicants' apparatus and method. More specifically, a storage services provider may enhance the services provided to a storage services customer by encoding, at a symbol rate, data received from the storage services customer to an information storage medium, and later reading that data from said information storage medium to form an analog signal. The storage services provider may, using Applicants' apparatus and method, asynchronously sample at a fixed sampling rate the analog signal to form sampled signals, form interpolated samples, and provide those interpolated samples to a fractionally-spaced equalizer at an interpolation rate, where that interpolation rate is greater than the symbol rate. The storage services provider may, using Applicants' apparatus and method, form synchronous, equalized samples at an equalization rate, where that equalization rate is less than or equal to the interpolation rate, adjust the gain of those equalized samples, and detect data symbols representing a maximum likelihood sequence estimate using said gain-adjusted, synchronous, equalized samples.

The embodiments of Applicants' method recited in FIGS. 7 and 8 may be implemented separately. Moreover, in certain embodiments, individual steps recited in FIGS. 7 and/or 8 may be combined, eliminated, or reordered.

In certain embodiments, Applicants' invention includes instructions residing in memory disposed in the data storage device comprising Applicants' read channel, where those instructions are executed by a processor disposed in the data storage device comprising Applicants' read channel to performs steps 720, 730, 740, 750, 760, 770, and/or 780, recited in FIG. 7, and/or steps 810, 820, 830, 840, 850, 860, 870, and/or 880, recited in FIG. 8.

In other embodiments, Applicants' invention includes instructions residing in any other computer program product, where those instructions are executed by a computer external to, or internal to, the information storage and retrieval system comprising Applicants' read channel, to perform steps 720, 730, 740, 750, 760, 770, and/or 780, recited in FIG. 7, and/or steps 810, 820, 830, 840, 850, 860, 870, and/or 880, recited in FIG. 8. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A read channel, comprising:
    an asynchronous analog to digital converter to asynchronously sample an analog signal formed by reading a data track at a rate greater than the first rate, wherein said data track was written to a data storage medium at a first rate;
    an upsampler to oversample in the asynchronous domain said analog signal at a rate greater than said first rate, wherein said upsampler is interconnected with said asynchronous analog to digital converter;
    an interpolator interconnected with said upsampler;
    a fractionally-spaced equalizer interconnected with said interpolator, wherein said interpolator provides interpolated samples to said fractionally-spaced equalizer at an interpolation rate, and wherein said fractionally-spaced equalizer forms synchronous equalized samples at an equalization rate, wherein said interpolation rate is greater than or equal to said equalization rate, and wherein said interpolation rate is greater than said first rate;
    a gain control module interconnected with said fractionally-spaced equalizer; and a sequence detector interconnected with said gain control module;

a first feedback circuit comprising a timing control circuit interconnected with said sequence detector and with said interpolator;

a second feedback circuit comprising a least mean square update circuit interconnected with said sequence detector and said fractionally-spaced equalizer.

2. The read channel of claim 1, further comprising a third feedback circuit interconnecting said sequence detector and said gain control module.

3. The read channel of claim 2, wherein said second feedback circuit is decoupled from said third feedback circuit.

4. The read channel of claim 3, wherein said sequence detector comprises a Partial Response Maximum Likelihood sequence detector.

5. The read channel of claim 3, wherein said sequence detector comprises a Noise Predictive Maximum Likelihood sequence detector.

6. The read channel of claim 5, wherein said Noise Predictive Maximum Likelihood sequence detector comprises a branch metric computation algorithm and a plurality of predictor filters, wherein said predictor filters are embedded into said branch metric computation algorithm, wherein each transition of said algorithm is associated with a different one of said plurality of predictor filters.

* * * * *